United States Patent
Anderson et al.

(10) Patent No.: US 10,248,960 B2
(45) Date of Patent: Apr. 2, 2019

(54) DATA MINING TO DETERMINE ONLINE USER RESPONSES TO BROADCAST MESSAGES

(75) Inventors: John Anderson, Berkeley, CA (US); Andrew P. Witkin, Oakland, CA (US); Sharon Witkin, legal representative, Oakland, CA (US); Cameron Davies, Winter Garden, FL (US); Anjali Dange, Orlando, FL (US); Miguel Campo-Rembado, Orlando, FL (US)

(73) Assignee: Disney Enterprises, Inc., Burbank, CA (US)

( * ) Notice: Subject to any disclaimer, the term of this patent is extended or adjusted under 35 U.S.C. 154(b) by 799 days.

(21) Appl. No.: 13/294,992

(22) Filed: Nov. 11, 2011

(65) Prior Publication Data

US 2012/0123854 A1    May 17, 2012

Related U.S. Application Data (60) Provisional application No. 61/414,384, filed on Nov. 16, 2010.

(51) Int. Cl.
*G06Q 30/02* (2012.01)

(52) U.S. Cl.
CPC ......... *G06Q 30/02* (2013.01); *G06Q 30/0244* (2013.01); *G06Q 30/0246* (2013.01)

(58) Field of Classification Search
CPC .... G06Q 30/02; G06Q 50/01; G06Q 30/0241; G06Q 30/0201; G06Q 30/0251
See application file for complete search history.

(56) References Cited

U.S. PATENT DOCUMENTS

| | | | |
|---|---|---|---|
| 5,625,748 A | 4/1997 | McDonough et al. | |
| 8,607,295 B2 * | 12/2013 | Bhatia | H04N 21/252 725/133 |
| 2006/0149710 A1 * | 7/2006 | Koningstein et al. | 707/3 |
| 2007/0208614 A1 * | 9/2007 | Arnett et al. | 705/10 |

(Continued)

FOREIGN PATENT DOCUMENTS

JP    2010033559 A    2/2010

OTHER PUBLICATIONS

Cheng, Alex and Evans, Mark, Inside Twitter an In-depth Look at the 5% of Most Active Users, Sysomos, Inc, Aug. 2009.*

(Continued)

*Primary Examiner* — Renae Feacher
(74) *Attorney, Agent, or Firm* — Kilpatrick Townsend & Stockton LLP (57) ABSTRACT

In a networked system, a method and apparatus for measuring advertising effectiveness involves broadcasting an advertisement at a broadcast time, monitoring at least one social network or other online forum following the broadcast time, filtering social network traffic to identify messages, search engine queries to identify queries, or other traffic entries, that appear to be responsive to the broadcast advertisement, determining a time of initiation for at least a plurality of entries that appear to be responsive to the broadcast advertisement, and determining at least one demographic for at least the plurality of the entries that appear to be responsive to the broadcast advertisement.

25 Claims, 4 Drawing Sheets

(56) References Cited

U.S. PATENT DOCUMENTS

| | | | | |
|---|---|---|---|---|
| 2008/0103907 | A1* | 5/2008 | Maislos | G06F 17/30867 705/14.54 |
| 2008/0104225 | A1* | 5/2008 | Zhang et al. | 709/224 |
| 2008/0133342 | A1* | 6/2008 | Criou et al. | 705/14 |
| 2008/0147487 | A1* | 6/2008 | Hirshberg | G06Q 30/02 705/14.53 |
| 2008/0172412 | A1* | 7/2008 | Gruhl et al. | 707/104.1 |
| 2008/0215607 | A1* | 9/2008 | Kaushansky | G06F 17/30867 |
| 2008/0243780 | A1* | 10/2008 | Nance et al. | 707/3 |
| 2008/0250447 | A1 | 10/2008 | Rowe et al. | |
| 2009/0157511 | A1 | 6/2009 | Spinnell et al. | |
| 2009/0172728 | A1* | 7/2009 | Shkedi | G06O 30/02 725/34 |
| 2009/0299816 | A1* | 12/2009 | Zigmond et al. | 705/10 |
| 2009/0319629 | A1* | 12/2009 | de Guerre | G06Q 10/107 709/206 |
| 2010/0191598 | A1* | 7/2010 | Toennis et al. | 705/14.36 |
| 2010/0203876 | A1* | 8/2010 | Krishnaswamy | 455/418 |
| 2010/0325659 | A1* | 12/2010 | Shkedi | 725/34 |
| 2011/0004662 | A1* | 1/2011 | Dodsworth | 709/206 |
| 2011/0099507 | A1* | 4/2011 | Nesladek et al. | 715/780 |
| 2011/0153414 | A1* | 6/2011 | Elvekrog | G06Q 30/02 705/14.43 |
| 2011/0225036 | A1* | 9/2011 | Reddy et al. | 705/14.42 |
| 2011/0320250 | A1* | 12/2011 | Gemmell et al. | 705/14.16 |
| 2012/0059722 | A1* | 3/2012 | Rao | 705/14.66 |

OTHER PUBLICATIONS

Chu et al., "Who is Tweeting on Twitter: Human, Bot, or Cyborg?," ACSAC '10 Dec. 6-10, 2010, Austin Texas.*
European Search Report dated Mar. 6, 2012 in EP 11189424.2, 7 pages.
Chintagunta, Pradeep, K., et al., "The Effects of Online User Reviews on Movie Box Office Performance: Accounting for Sequential Rollout and Aggregation Across Local Markets," Marketing Science, Sep.-Oct. 2010, vol. 29, No. 5, pp. 944-957.
Asur, Sitaram, et al., "Predicting the Future with Social Media," 2010 IEEE/WIC/ACM International Conference on Web Intelligence and Intelligent Agent Technology, Aug. 31, 2010, pp. 492-499.
Notification of First Examination Report dated Apr. 3, 2014 in European Application No. 11189424.2, 7 pages total.
Kyohei Kawazoe et al., "Research of Weblog Analysis Technology for Discovering and Acquiring Consumer Needs", Intec Technical Journal, Intec Inc., Jun. 2, 2008, vol. 8, pp. 36-41 (with Machine Translation, 27 pages).
Netmining Japan, "Continuously Evolving Web Insight Technology, Net+Mining", 16 Foremost Enterprises, Canaria Shoboh, Dec. 20, 2008, pp. 64-67, (with Machine Translation, 13 pages).
Eiji Namba, "Extraction and Summary of Trend Information—Summing a Trend, Intelligence and Information", Journal of Japan Society for Fuzzy Theory and Intelligent Informatics, Oct. 15, 2010, vol. 22, ,No. 5, pp. 549-555 (with Machine translation, 35 pages).
Mitsuo Yoshida, et al. , "Analysis of Tweets including URLs on Twitter", Proceedings of Second Forum on Data Engineering and Information Management (DEIM 2010), May 25, 2010, A5-1 (with English Abstract).
First Office Action/ Notice for Refusal, dated Oct. 13, 2015, for Japanese Patent Application No. 2011-250398, (with English Translation), 5 pages.
Japanese Application No. JP 2017-004032, "Office Action", dated Feb. 6, 2018, 8 pages.
F. Ko-Ji, "Best Practice for not excluding from twitter search" [online: Jan. 11, 2010] [searched on Aug. 29, 2016] http://blog.fkoji.com/2010/01112241.html (cited as indicative of a well-known technique).
Takahashi, software found at Comdes site in U.S.A. / AHP software OA Business Personal Computers, Denpa Newspaper Company, vol. 15, No. 2, Feb. 1, 1997, pp. 105-110.
Japanese Application No. JP2017-004032, "Office Action", dated Jul. 31, 2018, 3 pages.

* cited by examiner

DATA MINING TO DETERMINE ONLINE USER RESPONSES TO BROADCAST MESSAGES

CROSS-REFERENCES TO RELATED APPLICATIONS

This application claims benefit under 35 U.S.C. § 119(e) of U.S. Provisional Patent Application No. 61/414,384 filed Nov. 16, 2010, which is herein incorporated by reference in its entirety for all purposes.

FIELD

The present application relates to data mining of network activity in order to infer statistics about user responses and behaviors in general and in particular to using time-sensitive data sources to determine time-based responses to advertising messages in unrelated media and incidental activities.

BACKGROUND

Effectiveness of television advertising can be measured, somewhat, by broadcasting (sometimes in a loud voice) the message to "call now" so that interested parties will immediately make a phone call. However, such responses would likely be limited to those with an immediate interest in what is being sold and exclude those who are undecided about the offering, do not have immediate access to a telephone, etc., but might nonetheless be influenced by the advertising.

With the advent of Internet-based advertising (here, the "Internet" is used as just one example of a network over which many people can participate in many roles), other techniques have been developed for determining effectiveness of Internet ads, such as through the use of banner ads wherein the URL that is requested when a viewer clicks on the ad is a URL that first calls to an ad tracking server and then is passed on to another URL that provides the view with additional information. When the system providing the ad is the same as the one measuring response, the measuring might be simple. However, it is more complicated when there is not a direct connection.

A well-known adage, which some attribute to John Wanamaker (1832-1922), a department store merchant, is that "Half the money I spend on advertising is wasted; the trouble is I don't know which half." This has spurred advertisers to be more focused, so as to increase advertising effectiveness, but also to limit advertising so that it goes to interested consumers rather than to disinterested consumers.

Some approaches to advertising effectiveness rely on gathering large amounts of data on individual consumers and targeting advertisements to each of them. This is often disliked by consumers, who might not want individual details maintained on them, and still possibly seeing irrelevant advertising. This can also require inordinate amounts of effort on the part of advertisers in dealing with individual messages to each potential consumer.

BRIEF SUMMARY

In a networked system, a method and apparatus for measuring advertising effectiveness involves broadcasting an advertisement at a broadcast time, monitoring at least one social network, search engine or other online forum following the broadcast time, filtering social network traffic to identify messages, search engine queries to identify queries, or other traffic entries, that appear to be responsive to the broadcast advertisement, determining a time of initiation for at least a plurality of entries that appear to be responsive to the broadcast advertisement, and determining at least one demographic for at least the plurality of the entries that appear to be responsive to the broadcast advertisement, thereby assessing advertising effectiveness.

A method of advertising management is provided, wherein a tracked message is delivered in a broadcast fashion. Following that broadcast, aggregate reactions (i.e., aggregations of individual or group reactions to the broadcasted message) are monitored. Based on the aggregate reactions, selections are made about next actions, which could involve follow-on advertisements, changes in media, product or presentation, often in near real-time, or the like. The aggregate reactions (or even individual or group reactions) can be broadcasted as well. The aggregate reactions might be aggregated according to demographic slices of the overall audience.

The following detailed description together with the accompanying drawings will provide a better understanding of the nature and advantages of the teachings of the present application.

BRIEF DESCRIPTION OF THE DRAWINGS

In order to more fully understand the teachings of the present application, reference is made to the accompanying drawings. Understanding that these drawings are not to be considered limitations in the scope of the subject matter of the present application, the presently described embodiments and the presently understood best mode are described with additional detail through use of the accompanying drawings in which.

DETAILED DESCRIPTION

An improved data mining and feedback system is described herein. Such a system can be implemented using hardware and/or software in a networked, distributed and/or local server system.

In an example data mining and feedback system, a message is delivered in a broadcast fashion to a known or unknown group of recipients or potential recipients. The aggregate reactions of the recipients (or approximations, samplings or proxies thereto) are monitored, typically in real-time or near real time, and then some action is taken by the data mining and feedback system to decide what to broadcast next. The reactions might be broadcasted or not. Examples of actions to take are to alter the messaging based on feedback of the responses, altering content and/or providing additional messages. In some cases, the aggregate reactions are inferred from actions presumed to be in response to the initial message, without having certainty on that, and might involve monitoring messaging systems for messages presumed to be in response to the initial message, or to monitor search queries or other actions.

In some cases, the presumed responses are themselves inferred from other activity. For example, if an advertisement or content server serves content based on other aggregate actions, such as user queries or messages, then the activities of the advertisement or content server might be used to infer what that user activity was, which might not be directly observable. As a specific example, suppose an initial message were a broadcast advertisement about a movie titled "Speedy Sam Invades Lower Manhattan." Following the broadcast, if search queries for "Will 'Speedy Sam' ever show in Smalltown?" increase or show a sudden upswing, the advertiser might take a responsive action such as scheduling more advertisements (or movie showings) for the movie in Smalltown, whereas increases around the same time for hotel reservations in Lower Manhattan might be ignored as being unrelated to the initial message. Of course, in many cases, the correspondence between the initial message and the responses might not be as obvious as this example and might be even less obvious to an automated data mining process.

Details of various components of a data mining and feedback system are described below.

Figure 1:
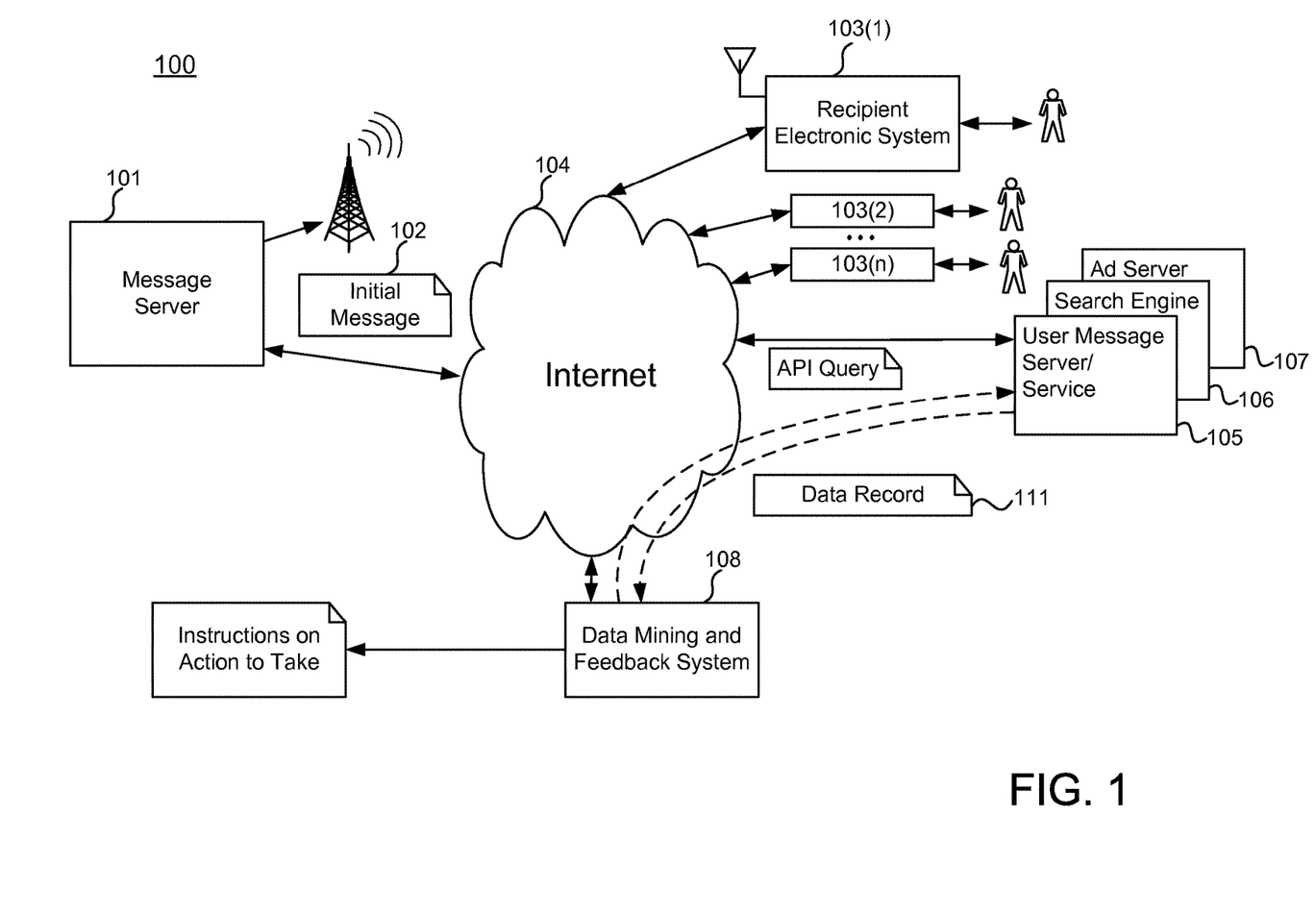
FIG. 1 illustrates an example data mining and feedback system according to one embodiment.

FIG. 1 illustrates an example data mining and feedback system. It should be understood that since it is known how to construct generic servers that can broadcast messages and or operate over a network, the particulars of a server or client device, or the operation of broadcast transmitters, Internet communications, and the like need not be described herein in great detail in order to understand the teachings of the present application.

In FIG. 1, a system 100 is shown, comprising a message server 101 that conveys an initial message 102 to a number of recipient electronic systems 103 where they can be viewed, heard, experienced, etc. by recipients. In response, recipients might take some action that can be electronically noticed, such as sending a message to a friend, to the messager, etc., perform a search, or take some other action, not necessarily explicitly in response to the initial message. Such actions might occur over the Internet 104 and might include sending a message via a user message server/service 105, initiating a search with a search engine system 106, or requesting content that in turn triggers the serving of other advertisements via ad server 107. A data mining and feedback system 108 is configured to make inquiries of such systems, such as by making an application programming interface ("API") call 110 to one or more of user message server/service 105, search engine system 106, or ad server 107 and getting a data record 111 in return that indicates, or can be used to determine, aggregate responses. Data mining and feedback system 108 can then process this information to determine appropriate actions and send out electronic instructions 115 to that effect.

Unlike a pure point-to-point system, wherein a message server sends a message to a known set of individual nodes and gets back individual responses, data mining and feedback system 108 can determine collective responses from an unknown set of recipients, even among messages initiated from non-recipients or messages initiated from recipients that are not in response to receiving the initial message. Data mining and feedback system 108 can use publicly accessible information or non-publicly accessible information.

Monitoring Effectiveness of Transmitted Messages

In some embodiments, a message is transmitted over a broadcast medium (television, radio, etc.) to an unknown number of recipients. To determine the impact of the message on those recipients (and possibly the size of the set), data mining and feedback system 108 can "data mine" traffic streams for various online social networks or other sources where messages to those sources can be scanned using a computer process, flagged by time of creation of the message, and relation to a particular advertisement. Using low latency feedback from these sources, programming of advertisements can be adjusted, possibly on a time scale from hours to a few days.

In a specific example, suppose Company C developed an advertising campaign for a Product P and scheduled an advertisement for Product P to run on a set of national spots at 6:00 pm. PST. As the advertisement is running, a computer process can monitor public postings. For example, the computer process can monitor a datastream provided by Twitter of messages posted by users of that service, monitor messages in other online forums, or the like. In other cases, the data scanned is not public, but is provided or available to the computer process. An example might be a search engine service that has a datastream comprising all of the search queries entered and the time they are entered.

The computer process may filter unrelated messages from messages that are responsive to the advertisement. For example, suppose Product P is a car, and it is the "Speedster" model. An advertisement is shown on television and then shortly thereafter messages show up on a social network (e.g., "Did you see that commercial for the car, the Speedster, showing it climbing the side of a building?" or "Saw an ad for a car that I want 2 buy."). As should be apparent from those two examples, sometimes it can be easy to identify a message that was sent in response to the advertisement and sometimes it is hard. Naturally, it is trivial to identify messages when they come from a user and are directed to the advertiser and relate to an advertisement (e.g., "I saw your ad for the car that climbs buildings and want to buy one. Where can I?" or "I just had to call to say I disagree with your advertisement."). It is more difficult when the messages are not necessarily directed back at the advertiser but are public messages directed at others, or inferences from non-messaging operations, such as searching using keywords.

In some instances, the non-messaging operations might be inferential. For example, if the messaging server operator has access to an advertising server (or aggregate data from the server) that serves ads based on what a group of participants are doing or requesting, but messaging server operator does not have access to data about what they are doing or requesting, the ad service patterns from the advertising server might be used as a proxy.

When the message traffic response, such as an aggregate indication of the message density, for a particular advertisement can be measured, at least approximately, it becomes possible to tailor the details (e.g., content, timing, repetition) of an advertising campaign, even while the campaign is occurring. In some instances, where demographics can be inferred or are available, that could be used to more clearly refine traffic analysis and feedback. For example, it may be that the product is heavily discussed in messages from social network users who have self-identified as cat-lovers, or aged 20-35, etc. and such demographics might be interesting, unexpected, and/or useful to the advertiser.

Sparse Vector Representations

A number of approaches might be provided for assessing the message activity. In one embodiment, individual entries (e.g., messages, searches, actions) are represented as sparse vectors of length O[1000-10000] where each entry comprises a floating point number representing an importance weight for a particular "word" or unit action. This representation allows the use of conventional or novel subspace technologies for further processing.

In a specific example, a stream of many thousands of messages or search queries ("entries") are scanned and parsed into individual words (which might be strings of characters and/or digits and/or punctuation) and a listing of words by frequency is generated. From that, the top N words in a selection set are excluded and words occurring less frequently than the top M words in the selection set. In a specific example, N=300 and M=10,000 so that the 10,000 most popular words are considered, except that the top 300 words are first discarded. Words can be "stemmed" ahead of time (e.g., so that "stop" and "stopping" are treated as the same one word).

Then, the weights of each of the remaining 9,700 words can form the set of sparse vectors. In some embodiments, the weights are directly related to the frequency of occurrence whereas in others, the weights also take into account an estimate of the descriptive power of the "words" that occur. For example, "horsepower" might get a higher descriptive weight than the word "the."

Filtering Automated Entries from Hand-Drafted Entries

In some cases, it might be desirable to use, as part of the filtering process, a subfilter that weights automated entries lower than manually created entries, even eliminating automated entries. Of course, where the particular application performs better with automated entries, the order can be reversed.

Separation of mechanical, or partially mechanical, entries from individually written entries might provide more of a flavor of what people are doing, rather than what computer processes are doing. Examples of mechanically or partially mechanically generated entries include bulk "retweets" in the Twitter system, reposted blog items, or entries generated using "blog this" or "tweet this" buttons on articles.

This separation is critical to further statistical analysis, since they are much more coherent than individually written entries. In some cases, different weights might be applied to entries depending on the manner in which it was created, if that can be determined. For example, simple-to-generate entries might be overrepresented relative to hard-to-generate entries. An example of a weight is where a value of "1" is applied to a pure manual entry and "0" is applied to a completely automated entry generation, with other values possible between those extremes.

One approach to measuring a weight that varies from mechanical entries to manual entries is to generate seeds of identical or nearly identical entries and then using these as cores accumulate entries that are "close" to these. "Close" might be defined in terms of Hamming distance, in terms of normalized distance in a subspace representation, and/or other definitions.

Another approach to measuring the weight is to define entries as a set of weightings on subspace basis vectors. Then, a filter process or module can search for peaks in one-dimensional or multidimensional histograms of the weights describing mechanically or partially mechanically or partially generated entries.

In this method, basis vectors might be optimized to maximize to loading specificity. For example, the varimax measure might be maximized in the entry direction to generate basis functions describing canonical tweets.

In some embodiments, peak detection involves two histograms staggered by ½ cell spacing and the peak detection is accomplished by comparing a cell value with the two overlapping cells in the other histogram. This catches peaks that might otherwise be lost because the data points of the peak get split over two bins.

In a specific implementation, a multidimensional space is loaded with coherent entries (such as tweets) that may form clusters that may create peaks. Then, the system takes amplitudes of loadings to form histograms and does the histograms with a phase shift so that peaks will not be flattened by where the histogram bins divide.

Hierarchical Groupings of Entries

Starting with a set of entries, divide them into a set of hierarchical groupings of similar entries. One use of such a division is to display to the user a set of entry statistics and time evolutions that are each identified by "typical" entries. These time series can also be used to identify the response to advertising events.

In one approach, an analysis system will construct a set of optimized basis vectors with sizes of order 5-50 in the method described above—for example by maximizing varimax measures. Using the loadings on these basis vectors, the analysis system will classify entries that have a significant loading magnitude on one of these vectors into a class defined by the vector with maximum loading amplitude. It then will recursively divide these classes and the residual class that does not have significant loading on any of the vectors.

Specifically, this might involve dividing up incoherent tweets and looking at the details, to take the modes of the subspace. The coordinate system then becomes the canonical tweets. Rather than conventional clustering, which has a complexity on the order of N squared, this method provides operations analogous to using loading vectors and then drawing lines in space to cut the space.

In another method, the analysis system will construct hierarchical classes by using conventional population exchange clustering techniques, where the distance is defined by a normalized vector distance in a subspace instead of using Hamming distance.

Surveillance System

A surveillance system might be provided for the quick identification of new topics for entries by continuously mapping new entries onto the basis functions as defined above. The Residual entries are then examined to determine if there are new coherent classes of entries—the entries associated with these new coherent classes are identified as new topics of discussion and potential interest. The subspace is modified to them to update for future surveillance. In effect, this can be used to track new memes (i.e., cultural or social ideas or concepts that are transmitted from person to person in a manner analogous to the biological transmission of genes) as opposed to looking for new hot topics by word searching.

Calculating a Basis Set

A method for calculating a basis set approximately spanning a subspace defined by the first O[3-50] singular value decomposition ("SVD") or principal component analysis ("PCA") modes (a truncation set) of a large sparse data matrix where an approximate 1st vector is calculated using a power method iterative approach where the convergence criterion is based not on it being a true mode but merely contained in the subspace defined by the truncation set. After the first vector is calculated, the original data matrix is not "deflated" since that would result in a less sparse data matrix. Instead, the subsequent basis vectors are constructed using a power method where the previous vectors are used to deflate the iteration vector—in a potentially "lazy" fashion.

By relaxing the requirement to find the eigenvalues exactly, processing is simplified. With sparse SVD, the original data matrix is sparse, so that is hard to analyze. In one approach, instead of finding the eigenvalues exactly, truncation is used.

Classifying Authors

One module of the system can classify the authors of a set of entries into canonical classes by grouping them with authors that have similar word usage patterns. These classes can be used to divide the authors into "equivalence classes" that can be used to infer demographic or interest group information. These classes can also be used to normalize favorability measures, since the mean favorability factors or defining tags for favorability may vary by author group. Classifying can also include an indication of whether or not the source of the response (i.e., the author) is mechanical (a computer respondent, bot, etc.) or a non-mechanical author, e.g., a human responding to his or her actual reception of the initial message.

For example, by doing the same analysis on the word distribution used by authors over multiple tweets, by an equivalence class and knowing some demographics, other demographics can be learned. Then, favorability by demographics can be assessed and determined relative to a baseline.

An example of word distribution might be a rule that if responses from a particular recipient have high incidences of "Mom," "Dad," "mall," and "school," it might be inferred that the messages are from the "suburban teenager" demographic, whereas high incidences of "burden of proof", "evidentiary hearing," and "cross-examination" might allow for an inference that the messages are from the "trial lawyer" demographic.

Other General Aspects

As highlighted in more detail above, a data mining and feedback system might be implemented over a network, where messages flow between nodes and computing devices are used by users at a plurality of nodes at least to initiate messages, where some of those users are recipients of a broadcast initial message from a message server or source. Advertising effectiveness can be measured for the at least one demographic, in part by, broadcasting an advertisement at a broadcast time, monitoring at least one aggregate activity stream following the broadcast time, filtering the aggregate activity stream to identify messages that appear to be responsive to the broadcast advertisement, determining when those messages were sent, filtering out messages that are probably unrelated, and determining at least one demographic for at least the plurality of messages that appear to be responsive to the broadcast advertisement.

The activity stream can represent one or more messages sent by one or more users, and an aggregate activity stream can represent activity streams from an aggregation of users that form a statistically significant group over which advertising effectiveness is to be measured. The aggregate activity stream can be messages that are social network traffic, messages that are search queries, requests for one or more web assets, or other messages or traffic. The requests for one or more web assets might be requests for web assets identified by URLs stored in a list of monitored URLs, wherein at least one of the monitored URLs is associated with at least one previously broadcast advertisement, such as an advertisement for a movie where the list of monitored URLs includes URLs for web pages containing information materials, promotional materials, or a trailer related to the advertised movie.

A real-time advertising management system might comprise a server for monitoring user messages in real-time, a data mining module for extracting or mining user activity, from the monitored user messages, that is determined to be reactions to a previously broadcast advertisement, and selecting one of a plurality of possible broadcast advertisements, based on results of extracted user activity determinations. As used herein, "real-time" refers to time periods within which users, viewers and others might perceive a response as being a real-time response. For example, if a half-hour television show is being broadcast and user messages sent 10 minutes into the show indicate that viewers would be interested in a particular advertisement, plot change, or other response, it might be sufficiently real-time to have the plot change at the 20-minute mark, but it might not be considered real-time to have the reaction occur several weeks later in a later episode of the show. Some real-time responses might be within a second of the user messages being broadcast, some within a few minutes, and some within a longer time period, depending on the particular context. In other contexts, perhaps even a few minutes would not be considered a real-time time period.

The previously broadcast advertisement might be an advertisement conveyed over one or more of television, radio, a billboard, and/or Internet advertising media. The selected one of the plurality of possible broadcast advertisements might be an advertisement to be conveyed over one or more of television, radio, a billboard, and/or Internet advertising media, such that the media for the previously broadcast advertisement and the selected one of the plurality of possible broadcast advertisements can be conveyed using distinct media.

The real-time advertising management system might include a message type analyzer to analyze messages and at least estimate or determine which messages are from mechanical sources and which messages are from non-mechanical sources. A non-mechanical source may be a source that includes a human response or reaction to the previously broadcast advertisement following in time, and in response to, or in reaction to, actually observing the previously broadcast advertisement.

The real-time advertising management system might also include logic for taking an action based on statistical measures of aggregates of messages, wherein an action taken for messages from mechanical sources is distinct from an action taken for messages from non-mechanical sources.

The real-time advertising management system might also include a message demographics analyzer to analyze messages and at least estimate or determine a demographic for a message based on message content.

One response of a real-time advertising management system might be to extract or mine user activity, from the monitored user messages, that is determined to be reactions to a previously broadcast advertisement, and alter one or more of a direction of broadcast content, a creative direction of a show, and/or a camera angle based on results of extracted user activity determinations.

While there are many possible examples, one specific set of examples will be described, with the understanding that the present scope of the present application is not limited to these specific examples. Suppose one implementation is for measurement of marketing effectiveness of broadcast messages that relate to the feature film "Famous Pirate Movie, Part 2" and its star "Stanley Big-Talent."

First, a filter check might be performed on a search engine stream, to identify the words that match the search terms, such as "Pirates", "Stanley", "Big-Talent", etc. Next, a demographic tagger might tag messages that have words as "diads" or as "phrases", but this might also apply to single words. Using the demographic tagger, an age group of the message source might be identified. For example, "Stanley is groovy", "Stanley is the bomb", and "Stanley is sick" are different ways of expressing a favorable view of Stanley Big-Talent, but are specific to specific age groups (e.g., "sick" is a synonym for "great" in some teenager and pre-teen lingos). Some dialects, idioms or linguistic details might allow for demographic tagging by geographic region.

Once a message is tagged, it can be further characterized by a message type, such as "mechanical" versus "non-mechanical." This can be done by identifying the level of similarity between messages, wherein mechanical messages score very high on similarity, and can be removed or down weighted.

Sentiment analysis can then be performed. While many messages might have a mixed sentiment, they might still be grouped as "generally positive," "generally negative," and "mixed." In some cases, the mixed nature of the message can be split. For example, the message "I can't believe they are making another Famous Pirate movie. Stanley Big-Talent is hot." Is a mixed message, but still is useful because it indicates a negative rating for one topic (the movie) and a positive rating for another topic (the lead actor) and this could be used effectively for marketing by downplaying the movie itself and boosting the actor.

Pulse Triggers and Continuous Triggers

As explained above, a broadcast advertisement might be sent out and responses measured. This is an example of how the systems described herein could be used to generate a "pulse" and measure a "pulse response" shortly thereafter. For example, two advertisements might be developed for a movie, each focusing on different characters in the movie. If a first pulse is sent (e.g., the advertisement focusing on the first character is broadcast) and the response is measured, a later pulse (or a pulse in a different direction or market at the same or different time) focusing on the second character is sent out and the response measured. The differences in the pulse responses can be used to adjust the movie or further marketing. In some cases, where differentiation of pulse responses is possible, there might be two (or more) simultaneous pulses in the same market.

In some embodiments, a pulse is sent out, the responses simply recorded, with irrelevant or unrelated responses discarded. From the remaining responses, an analysis system might generate a set of sparse vectors that are used as a sparse SVD, with hierarchical clustering provided. The message type (mechanical or non-mechanical) might be taken into account, or not. The message format (e.g., SMS text, social network message, short message using a service such as Twitter, e-mail, etc.) might also be taken into account. From such analysis of the responses, inferences can be made about the effect of the pulse and actions taken in response to those inferences. Some actions might include changing a future advertisement, product or service offering or other actions. In the case of movies, the inferences might be used to alter the movie, such as editing a movie so that if a pulse relating to a particular character results in a higher than expected response, increasing the importance of that character in the movie, so as to satisfy audiences in advance.

In some embodiments, pulses and responses are not limited to discrete events, but can form a continuously monitored feedback loop, where there is a stream of pulses, or the discrete feedback loop wherein the response to a pulse is an action that is itself a pulse for further response analysis.

Figure 2:
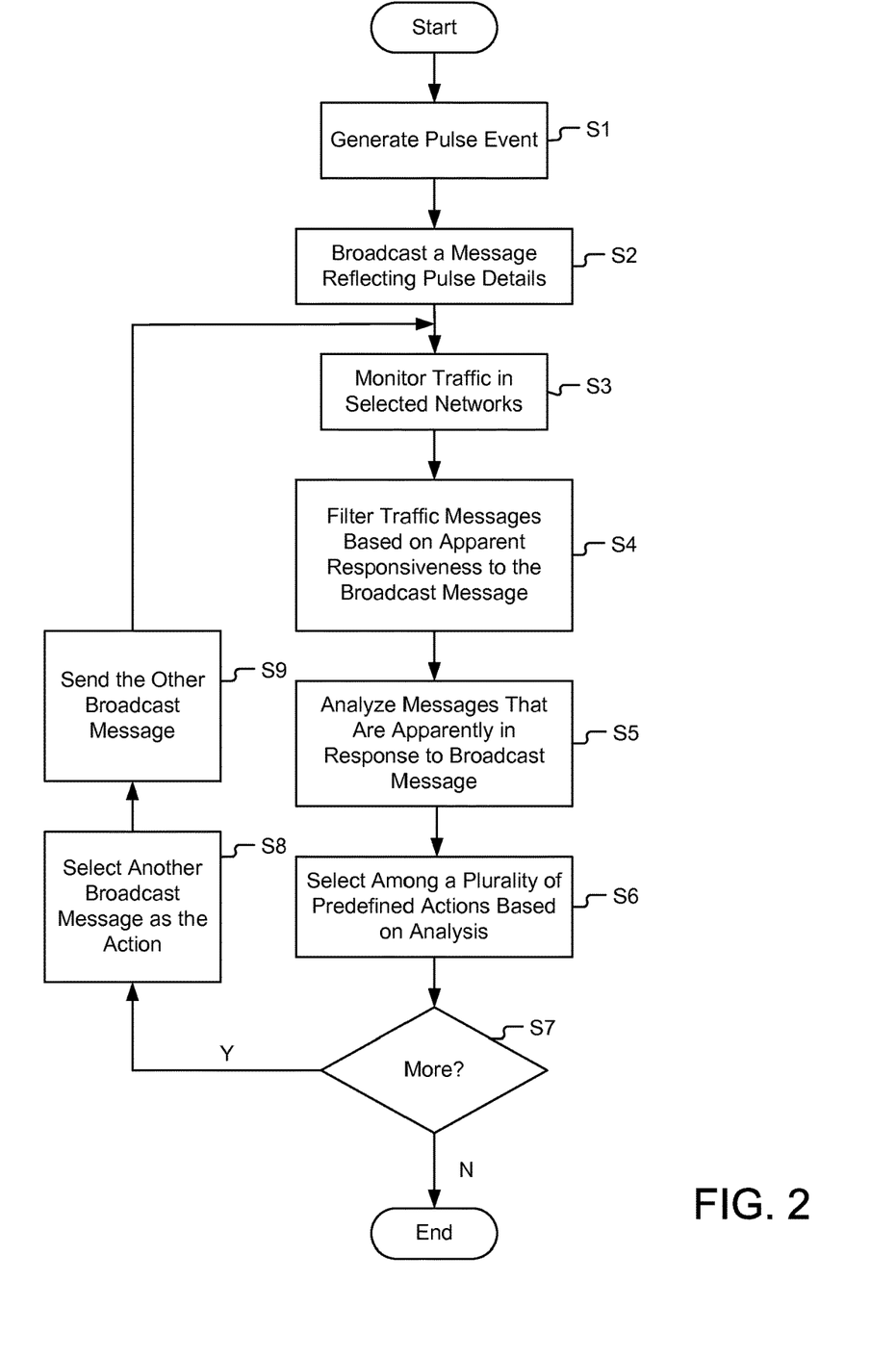
FIG. 2 is a flowchart of a method for data mining to determine responses to messages.

FIG. 2 is a flowchart of a method for data mining to determine responses to messages. As shown there, the method begins with a pulse event being generated (step S1). This might be message or communication or other event that is to trigger responses. A message reflecting that pulse event is generated, such as a broadcast advertisement, at a time $t_b$ (step S2). Following time $t_b$, a message monitor monitors network traffic (S3). This traffic can take the form of social networking messages (e.g., postings of Twitter messages, activity on Facebook pages, etc.), search queries, URL requests, etc.

The monitored traffic is filtered to exclude, ignore and/or reduce the weight of messages that are deemed not resulting from the pulse event (S4) and that occurred after time $t_b$. Of the messages that remain, that are deemed to be a response, result and/or reaction to the pulse event, they are analyzed in the aggregate to determine characteristics of the messages (S5). In some cases, words used are considered, demographics are estimated, and/or topics of discussion are extracted. Details of such operations are described above.

From the results of the analysis, an analyzer system selects from among a plurality of predetermined options (S6), which might involve selecting a follow-up advertisement, a change to a product, service or offering, or other action. That action is then taken, or instructions to perform that action are issued, which might be in the form of an automated electronic message.

If there is a feedback loop, more actions might be taken (S7), such as where the selected action is the sending of a subsequent broadcast message (S8), sending the message (S9) and looping back to monitor the resulting network traffic.

Figure 3:
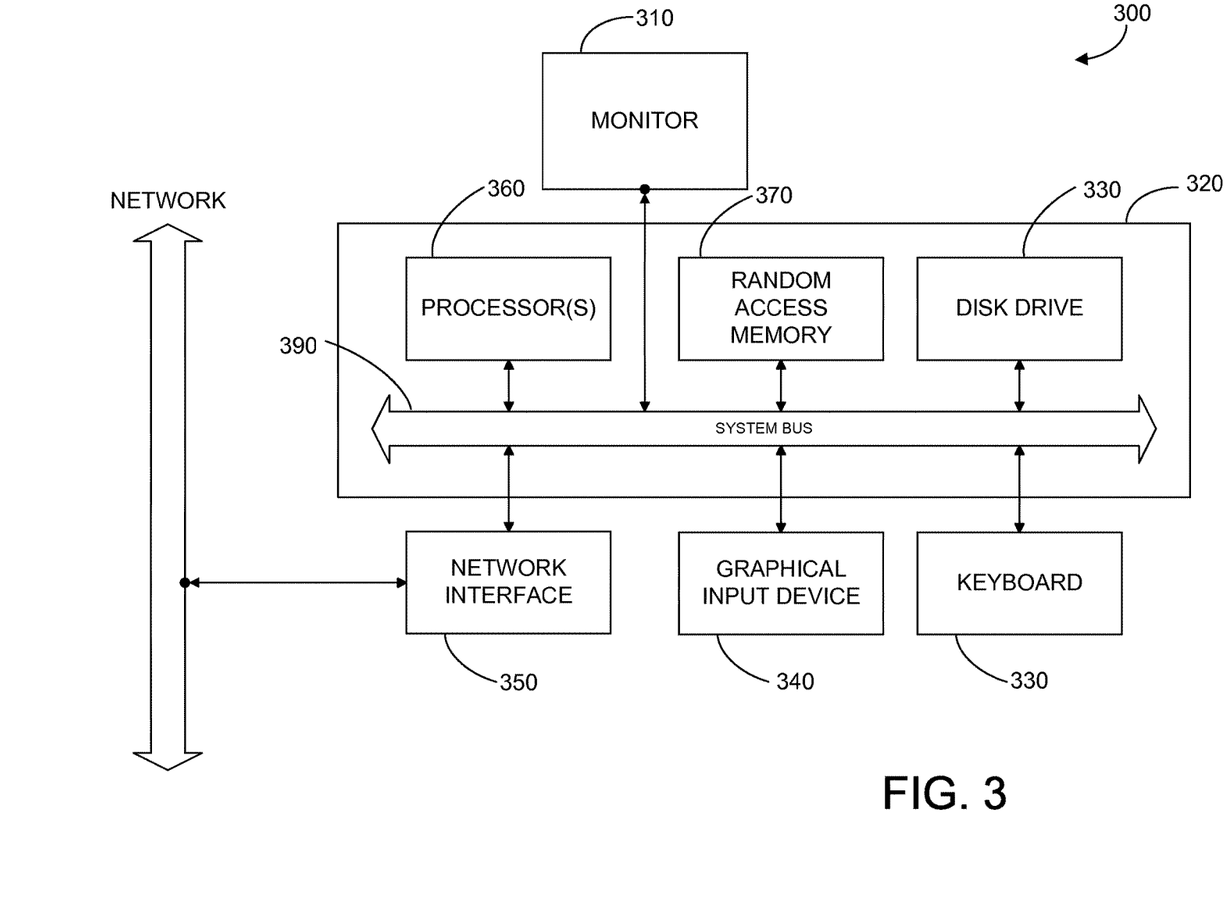
FIG. 3 is a block diagram of a computer system on which some of the elements might operate.

FIG. 3 is a block diagram of a computer system on which some of the elements of the methods and systems of the present application might operate. Shown there is a typical computer system 300 according to various embodiments described in the present application. In various embodiments, computer system 300 typically includes a monitor 310, computer 320, a keyboard 330, a user input device 340, a network interface 350, and the like.

In the present embodiment, user input device 340 is typically embodied as a computer mouse, a trackball, a track pad, wireless remote, and the like. User input device 340 typically allows a user to input selections of actions and insert rules for various rulesets used by components of the data mining system.

Embodiments of network interface 350 typically include an Ethernet card, a modem (telephone, satellite, cable, ISDN), (asynchronous) digital subscriber line (DSL) unit, and the like. Network interface 350 is typically coupled to a computer network as shown. In other embodiments, network interface 350 may be physically integrated on the motherboard of computer 320, may be a software program, such as soft DSL, or the like.

Computer 320 typically includes familiar computer components such as a processor 360, and memory storage devices, such as a random access memory (RAM) 370, disk drives 380, and system bus 390 interconnecting the above components. In one embodiment, computer 320 is a PC compatible computer having multiple microprocessors such as Xeon™ microprocessor from Intel Corporation.

RAM 370 and disk drive 380 are examples of tangible media for storage of rules, program code, content usable for broadcast messages and pulse details, as well as storage of analysis results and message aggregate data. Storage might also include other computer programs, operating system code, embodiments described in the present application, program code configured to direct computer system 300 to perform the above described functions, and the like. Other types of tangible media include floppy disks, removable hard disks, optical storage media such as CD-ROMS, DVDs, Blu-Ray disks, semiconductor memories such as flash memories, read-only-memories (ROMS), battery-backed volatile memories, networked storage devices, and the like.

In the present embodiment, computer system 300 may also include software that enables communications over a network such as the HTTP, TCP/IP, RTP/RTSP protocols, and the like. In alternative embodiments, other communications software and transfer protocols may also be used, for example IPX, UDP or the like.

FIG. 3 is representative of computer systems capable of embodying aspects of the teachings of the present application. It will be readily apparent to one of ordinary skill in the art that many other hardware and software configurations are suitable for use with embodiments described herein. For example, the use of other microprocessors are contemplated, such as Core™ or Itanium™ microprocessors; Opteron™ or Phenom™ microprocessors from Advanced Micro Devices, Inc., and the like. Further, other types of operating systems are contemplated, such as Windows® operating system such as WindowsVista®, WindowsNT®, or the like from Microsoft Corporation, Solaris from Sun Microsystems, LINUX, UNIX, MAC OS from Apple Corporation, and the like.

Figure 4:
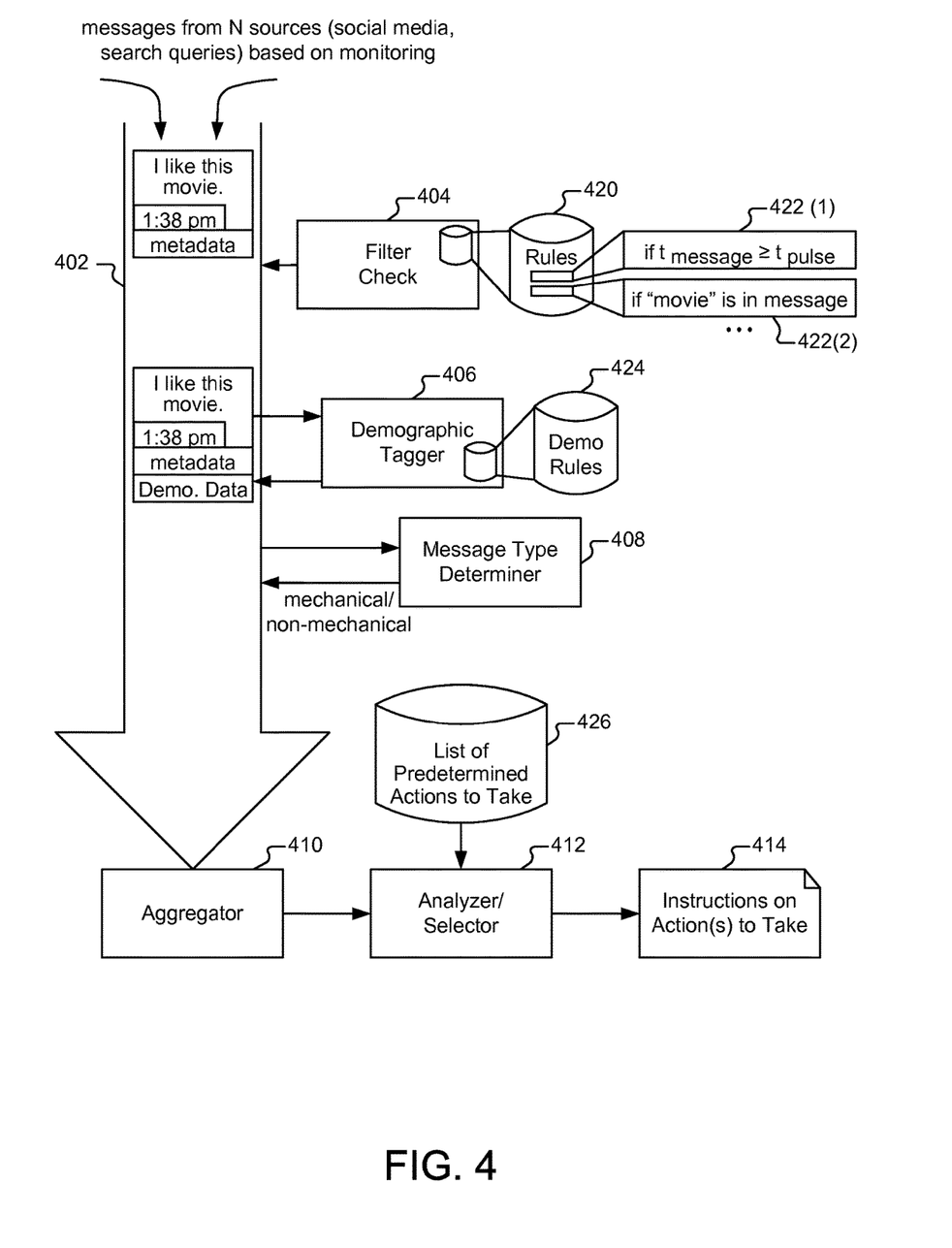
FIG. 4 is a block diagram illustrating operation of various processing components processing a message stream.

FIG. 4 is a block diagram illustrating operation of various processing components processing a message stream. As illustrated there, messages from various sources (such as those explained elsewhere herein) are provided to a pipeline 402. Operating on messages in pipeline 402 are a filter check process 404, a demographic tagger 406, a message type determiner 408, and an aggregator 410. The output of aggregator 410 is provided to an analyzer/selector 412 that outputs instructions 414 on actions to take. Examples of instructions might be an electronic alert to a media director indicating statistics of the response to a pulse event.

Filter check process 404 might be program code that compares elements of messages/searches/URLs (text, content, metadata, timestamp, etc.) against a set of filter rules 420 stored in electronic form. Some example rules 422 are illustrated, such as a rule 422(1) that messages that are time stamped prior to the pulse timestamp are filtered out (because causality indicates that they are not in response to the pulse) and a rule 422(2) that messages that contain the word "movie" are filtered in. Rules might be applied in various orders or might be order independent. Rules might be combined in "and," "or," and/or "xor" fashion. Rules might result in weights being assigned, where the combined weight of the rules forms a score relating to the certainty as to whether a message is in response to a pulse.

One message is shown, which is just an example, and many more might be present. That message has the text "I like this movie" and has a timestamp of 1:38 pm. This message might or might not be related to a movie advertisement that occurred at 1:30 pm. Of course, if the movie advertisement was for Disney/Pixar's "Cars 2" broadcast in the San Francisco Bay Area at 1:30 pm and a message was from a social network user self-identified as being from San Francisco, Calif. and the text of the message was "Wow! I just saw the Cars 2 trailer on TV and can't wait to see the movie," filter check process 404 might hit several "filter in" rules (e.g., broadcast area and user demographic area overlap, timestamps are close in time, "saw" and "trailer" were in the message, a match occurred between the topic of the advertisement and text in the message—"Cars 2," etc.) such that filter check process 404 would highly weight the message towards being a response to the advertisement.

Demographic tagger 406 might be program code that compares elements of messages/searches/URLs (text, content, metadata, timestamp, etc.) against a set of demography rules 424 so as to generate, for given messages, demographic indications or estimates, which can then be attached or associated with the respective messages, thereby allowing for downstream processes to take that information into account.

Message type determiner 408 determines, from the available information, an estimate of whether the message is human-initiated or mechanically- (e.g., computer-) generated, so that downstream processes can weight the message accordingly.

In this manner, streams of messages can be analyzed in the aggregate to determine possible responses to reactions to a pulse event such as an advertisement.

Further embodiments can be envisioned to one of ordinary skill in the art after reading this disclosure. In other embodiments, combinations or sub-combinations can be advantageously made. The example arrangements of components are shown for purposes of illustration and it should be understood that combinations, additions, re-arrangements, and the like are contemplated in alternative embodiments. Thus, while the present application describes exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. In a system wherein computing devices are used by users at a plurality of nodes at least to initiate messages that flow between nodes of the plurality of nodes, a method of measuring advertising effectiveness, the method comprising:

monitoring, by a processor, at least one aggregate activity stream following a broadcast time of a broadcast advertisement, wherein the at least one aggregate activity stream represents one or more messages sent by an aggregation of users that form a statistical group over which advertising effectiveness is to be measured, wherein each of the one or more messages representing the at least one aggregate activity stream do not include the broadcast advertisement;

filtering, by the processor, the one or more messages representing the at least one aggregate activity stream to identify messages that appear to be responsive to the broadcast advertisement, wherein filtering the one or more messages includes determining which of the identified messages were sent before the broadcast time of the broadcast advertisement, and determining which of the identified messages are mechanically generated and which of the identified messages are not mechanically generated, wherein a mechanically generated message includes a message that was previously sent at a prior time and that is resent following the broadcast time, and wherein a non-mechanically generated message includes a message that is sent following the broadcast time and that is based on a human response from an observation of the broadcast advertisement;

assigning, by the processor, a first weight value to the identified messages that are mechanically generated and assigning a second weight value to the identified messages that are non-mechanically generated, wherein the first weight value is less than the second weight value;

classifying, by the processor, the identified messages into a plurality of groups, wherein the identified messages are classified into a group based at least in part on a word pattern or phrase associated with an author;

determining, by the processor, a demographic for each of the plurality of groups; and for each demographic:

determining, by the processor, a measure of favorability based on the identified messages in one or more groups corresponding to the demographic and the weight values assigned to the identified messages in the one or more groups.

2. The method of claim 1, wherein the at least one aggregate activity stream comprises messages that are associated with social network traffic, and wherein monitoring comprises monitoring at least one social network following the broadcast time.

3. The method of claim 1, wherein the at least one aggregate activity stream comprises messages that are search queries, and wherein monitoring comprises monitoring at least one search engine query stream following the broadcast time.

4. The method of claim 1, wherein filtering the at least one aggregate activity stream to identify messages that appear to be responsive to the broadcast advertisement comprises:

determining a time of initiation for a message of the one or more messages; and filtering the message as not responsive to the broadcast advertisement based on determining that the time of initiation for the message occurs earlier than the broadcast time.

5. An advertising management system, comprising:

one or more processors; and memory coupled to the one or more processors, wherein the memory stores instructions configured to cause the one or more processors to perform a method comprising:

filtering user messages following a broadcast time of a broadcast advertisement to identify the user messages that appear to be responsive to the broadcast advertisement, wherein each of the user messages do not include the broadcast advertisement, wherein filtering the user messages includes determining which of the identified user messages were sent before the broadcast time of the broadcast advertisement, and determining which of the identified user messages are mechanically generated and which of the identified user messages are not mechanically generated, wherein a mechanically generated message includes a message that was previously sent at a prior time and that is resent following the broadcast time, and wherein a non-mechanically generated message includes a message that is sent following the broadcast time and that is based on a human response from an observation of the broadcast advertisement;

assigning a first weight value to the filtered messages that are mechanically generated and assigning a second weight value to the filtered messages that are non-mechanically generated, wherein the first weight value is less than the second weight value; and classifying the identified messages into a plurality of groups, wherein the identified messages are classified into a group based at least in part on a word pattern or phrase associated with an author;

determining a demographic for each of the plurality of groups; and for each demographic:

determining a measure of favorability based on the identified messages in one or more groups corresponding to the demographic and the weight values assigned to the identified messages in the one or more groups.

6. The advertising management system of claim 5, wherein the user messages comprise messages in a social network system.

7. The advertising management system of claim 5, wherein the user messages comprise search queries submitted to a search engine.

8. The advertising management system of claim 5, wherein the user messages comprise one or more of social media messages, search queries, or requests for one or more web assets.

9. The advertising management system of claim 8, wherein the requests for one or more web assets comprise requests for web assets identified by URLs stored in a list of monitored URLs, wherein at least one of the monitored URLs is associated with at least one previously broadcast advertisement.

10. The advertising management system of claim 9, wherein the previously broadcast advertisement is an advertisement for movie and the list of monitored URLs includes URLs for web pages containing informational materials, promotional materials, or a trailer related to the advertised movie.

11. The advertising management system of claim 5, wherein a broadcast during the broadcast time of the broadcast advertisement is conveyed over one or more of television, radio, a billboard, or Internet advertising media.

12. The advertising management system of claim 5, wherein the method further comprises:

analyzing the user messages and determining a source class of each of the user messages, the source class chosen from a plurality of source classes based on one or both of message content or a message header.

13. The advertising management system of claim 5, wherein the method further comprises:

selecting one of a plurality of broadcast advertisements based on the filtered messages.

14. An advertising management system, comprising:

a memory storage device to store extracted user activity that includes data about user messages;

one or more processors; and memory coupled to the one or more processors, wherein the memory stores instructions configured to cause the one or more processors to perform a method comprising:

filtering user messages following a broadcast time of a broadcast advertisement to identify user messages that appear to be responsive to the broadcast advertisement, wherein each of the user messages do not include the broadcast advertisement, wherein filtering the user messages includes determining which of the identified user messages were sent before the broadcast time of the broadcast advertisement, and determining which of the identified user messages are mechanically generated and which of the identified user messages are not mechanically generated, wherein a mechanically generated message includes a message that was previously sent at a prior time and that is resent following the broadcast time, and wherein a non-mechanically generated message includes a message that is sent following the broadcast time and that is based on a human response from an observation of the broadcast advertisement;

assigning a first weight value to the filtered messages that are mechanically generated and assigning a second weight value to the filtered messages that are non-mechanically generated, wherein the first weight value is less than the second weight value;

classifying the identified messages into a plurality of groups, wherein the identified messages are classified into a group based at least in part on a word pattern or phrase associated with an author;

determining a demographic for each of the plurality of groups; and for each demographic:
determining a measure of favorability based on the identified messages in one or more groups corresponding to the demographic and the weight values assigned to the identified messages in the one or more groups.

15. The advertising management system of claim 14, wherein the user messages comprise one or more of social media messages, search queries, or requests for one or more web assets.

16. The advertising management system of claim 14, wherein filtering of the user messages is adjusted based at least in part on a demographic determined for a group.

17. The advertising management system of claim 14, wherein the method further comprises:
analyzing the user messages and determining a source class of each of the user messages, the source class chosen from a plurality of source classes based on one or both of message content or a message header.

18. An advertising management system, comprising:
one or more processors; and
memory coupled to the one or more processors, wherein the memory stores instructions configured to cause the one or more processors to perform a method comprising:
filtering user messages following a broadcast time of a broadcast advertisement to identify the user messages that appear to be responsive to the broadcast advertisement, wherein each of the user messages do not include the broadcast advertisement;
wherein filtering the user messages includes determining which of the identified user messages were sent before the broadcast time of the broadcast advertisement, and determining which of the identified user messages are mechanically generated and which of the identified user messages are not mechanically generated, wherein a mechanically generated message includes a message that was previously sent at prior time and that is resent following the broadcast time, and wherein a non-mechanically generated message includes a message that is sent following the broadcast time and that is based on a human response from an observation of the broadcast advertisement; and adjusting content in the broadcast advertisement based at least in part on results of identified user messages responsive of a broadcast advertisement.

19. The method of claim 1, wherein the mechanically generated message includes a short message system (SMS) message resent following the broadcast time or a social network message resent following the broadcast time.

20. The method of claim 1, wherein filtering the identified messages comprises parsing the identified messages into words, and applying a weight value to each particular word of the words based at least in part on a frequency of occurrence of the particular word.

21. The method of claim 1, wherein the first weight value is different from the second weight value, and wherein the at least one demographic is based at least in part on content of the identified messages that are non-mechanically generated.

22. The method of claim 1, wherein determining which of the identified messages are mechanically generated includes determining which of the identified messages have similar phrases.

23. The method of claim 1, wherein the identified messages are further classified into a group based on a word distribution of a set of words associated with the author corresponding to the group.

24. The method of claim 1, further comprising:
generating a plurality of seed terms; and
computing a value by comparing each of the identified messages to the plurality of seed terms, the computed value indicating a measure of closeness of an identified message to the plurality of seed terms;
wherein a weight value is assigned to each of the identified messages based on the computed value for each of the identified messages.

25. The method of claim 1, wherein the broadcast advertisement has a first format type that is different from a second format type of each of the one or more messages representing the at least one aggregate activity stream.

* * * * *